US011757956B2

(12) United States Patent
Kpemou (10) Patent No.: US 11,757,956 B2
(45) Date of Patent: Sep. 12, 2023

(54) INTERNET (OVER THE TOP) WORLDWIDE PUBLIC CHAT CAPABILITIES MATCHED TO SPECIFIED ("URL") STREAMING CONTENT AND NON SPECIFIED ("PRENAMED AND HARDCODED") STREAMING CONTENT ROOMS

(71) Applicant: Tracy Kpemou, London (GB)

(72) Inventor: Tracy Kpemou, London (GB)

( * ) Notice: Subject to any disclaimer, the term of this patent is extended or adjusted under 35 U.S.C. 154(b) by 0 days.

(21) Appl. No.: 17/535,928

(22) Filed: Nov. 26, 2021

(65) Prior Publication Data

US 2023/0171295 A1 Jun. 1, 2023

(51) Int. Cl.
*H04L 65/403* (2022.01)
*G06F 9/54* (2006.01)
*G06F 16/958* (2019.01)
*G06F 16/955* (2019.01)
*H04L 65/61* (2022.01)

(52) U.S. Cl.
CPC .......... *H04L 65/403* (2013.01); *G06F 9/547* (2013.01); *G06F 16/9566* (2019.01); *G06F 16/986* (2019.01); *H04L 65/61* (2022.05)

(58) Field of Classification Search
CPC . H04L 65/40–65/4092; G06F 16/907–16/986; G06F 16/953–16/9566; G06F 9/54–9/547
See application file for complete search history.

(56) References Cited

U.S. PATENT DOCUMENTS

| | | |
|---|---|---|
| 5,828,839 A | 10/1998 | Moncreiff |
| 6,346,952 B1 | 2/2002 | Shtivelman |
| 6,519,771 B1 | 2/2003 | Zenith |
| 6,708,172 B1 | 3/2004 | Wong et al. |
| 7,092,821 B2 | 8/2006 | Mizrahi et al. |
| 7,401,098 B2 | 7/2008 | Baker |
| 7,861,176 B2 | 12/2010 | Weisberg |
| 7,941,755 B2 | 5/2011 | Siegrist et al. |

(Continued)

OTHER PUBLICATIONS

"SharePlay powers new ways to stay connected and share experiences in FaceTime", Nov. 18, 2021, Apple, pp. 1-9 (Year: 2021).*

(Continued)

*Primary Examiner* — Clayton R Williams
(74) *Attorney, Agent, or Firm* — White-Welker & Welker, LLC; Matthew T. Welker, Esq.

(57) ABSTRACT

Techniques for Internet ("over the top") worldwide public chat capabilities matched to specified ("URL") streaming content. The techniques augmented to allow interaction between users watching specified ("URL") and non-specified ("Prenamed & hardcoded") content by sending messages to other users in various ways such as: mentions '@user', direct messages (privately end to end superficially hidden) 'dm@user' or general messages sent within the body of the chat window viewable to all. Users all around the world can opt to use a 'watch together' feature which either joins them to an existing room created from the specified content URL or creates a unique room dedicated to the specified content URL—and thus, connecting users who are watching the same content and allowing them to chat using either of the messaging interactions mentioned above.

13 Claims, 5 Drawing Sheets

(56) References Cited

U.S. PATENT DOCUMENTS

| | | |
|---|---|---|
| 9,305,319 B2 | 4/2016 | Maor |
| 9,489,353 B2 | 11/2016 | PimaZar |
| 9,532,104 B2 | 12/2016 | Im |
| 9,652,810 B2 | 5/2017 | Richter et al. |
| 10,116,900 B2 | 10/2018 | Wood |
| 10,182,024 B1 | 1/2019 | Chung |
| 10,594,502 B1 | 3/2020 | Soroker |
| 10,652,290 B2 | 5/2020 | Albouyeh |
| 11,134,041 B1* | 9/2021 | He ................ H04W 4/20 |
| 2006/0184886 A1 | 8/2006 | Chung et al. |
| 2006/0235932 A1* | 10/2006 | Celi ............ H04L 12/1822 |
| | | 709/207 |
| 2009/0094331 A1 | 4/2009 | Nobori |
| 2009/0182806 A1 | 7/2009 | Shivaji-Rao |
| 2009/0228944 A1 | 9/2009 | Bodlaender |
| 2009/0307319 A1 | 12/2009 | Dholakia |
| 2013/0046828 A1 | 2/2013 | Grewal |
| 2013/0080928 A1 | 3/2013 | Zhuang et al. |
| 2014/0317186 A1 | 10/2014 | Niemi |
| 2015/0033153 A1 | 1/2015 | Knysz et al. |
| 2016/0191578 A1 | 6/2016 | Kim |
| 2018/0096305 A1 | 4/2018 | Ishikawa |
| 2018/0131558 A1* | 5/2018 | Sharma ............ H04L 67/04 |
| 2019/0066155 A1* | 2/2019 | Onoda ............ H04L 51/14 |
| 2019/0379732 A1 | 12/2019 | Guan |

OTHER PUBLICATIONS

Aliya Chaudhry, "How to watch videos with friends online", Jul. 1, 2020, The Verge, pp. 1-11 (Year: 2020).*

Greta Heggeness," Ways to Watch Movies Together Online It's Easier Than You Think", May 26, 2021, Pure Wow, pp. 1-9 (Year: 2021).*

Andrew Heinzman, "The Best Ways to Stream Videos With Friends Online", Apr. 8, 2020, Review Geek, pp. 1-9 (Year: 2020).*

Benjamin Rancourt, "How to Create a Chrome Extension to Edit Websites", 2021, Benjamin Rancourt, pp. 1-8 (Year: 2021).*

Stack Overflow, "Modify HTML of loaded pages using chrome extensions", 2021, Stack Overflow, pp. 1-4 (Year: 2016).*

Super User, "Chrome extension to change HTML tags automatically when loading pages?", 2018, pp. 1-2 (Year: 2018).*

Robert Zak, "14 Apps to Watch Videos with Online Friends", Make Tech Easier, pp. 1-19 (Year: 2021).*

Kimberly Gedeon, "I watched Netflix with friends using four Chrome extensions—this is the best one", Apr. 11, 2020, LaptopMag, pp. 1-7 (Year: 2020).*

* cited by examiner

INTERNET (OVER THE TOP) WORLDWIDE PUBLIC CHAT CAPABILITIES MATCHED TO SPECIFIED ("URL") STREAMING CONTENT AND NON SPECIFIED ("PRENAMED AND HARDCODED") STREAMING CONTENT ROOMS

SEQUENCE LISTING OR PROGRAM

Not Applicable

TECHNICAL FIELD OF THE INVENTION

The present invention relates generally to a web browser extension. More specifically, the present invention relates to people communications and, more specifically, to join people to chats while watching the same video on different video streaming platforms.

BACKGROUND OF THE INVENTION

Watching video online over the Internet has become more and more popular and it is replacing traditional ways like cinema theaters. This raises a problem of people staying separate at home and being unable to communicate and discuss video content with friends and others. platform offers a solution for this and allows people to communicate while watching the same video at different "offline" locations.

Therefore, what is needed is a platform that is a combination of server and client software applications that integrates chat functionality into popular video streaming platforms including but not limited to NETFLIX, AMAZON PRIME, APPLE TV, DISNEY+.

Additionally, what is needed for seamless implementation to current streaming technologies is a Browser extension technology to parse pages browsed by a user that can embed a special visual interface inside pages that match special conditions (URL, page content). Finally, such a needed system should support both registered users and guest sessions for a truly unlimited and universal experience for all.

Definitions

Unless stated to the contrary, for the purposes of the present disclosure, the following terms shall have the following definitions:

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

The Domain Name System (DNS) is a hierarchical distributed naming system for computers, services, or any resource connected to the Internet or a private network. It associates various information with domain names assigned to each of the participating entities. Most prominently, it translates domain names, which can be easily memorized by humans, to the numerical IP addresses needed for the purpose of computer services and devices worldwide. The Domain Name System is an essential component of the functionality of most Internet services because it is the Internet's primary directory service.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems.[1] HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating in the Internet.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.\
Resource records (RRs) are the data records permissible in zone files of the Domain Name System (DNS).

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "computer system" or "system" consists of hardware components that have been carefully chosen so that they work well together and software components or programs that run in the computer. The main software component is itself an operating system that manages and provides services to other programs that can be run in the computer. The complete computer made up of the CPU, memory and related electronics (main cabinet), all the peripheral devices connected to it and its operating system. Computer systems fall into two categories: clients and servers.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client—server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML, and CSS) and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

A "web page", also written as webpage is a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyper-linking between them conveys the reader's perceived site structure and guides the reader's navigation of the site.

SUMMARY OF THE INVENTION

The present invention enables any user to join any available chat room and communicate with other users in the same chat room (chat channel). A list of available rooms is stored on the server and requested using server API. Software implementation of chats is done using a 3rd party API. Communication includes the ability to read public and private messages from other users, write a message to all users in a chat room or direct message personally to a single user. Messaging allows usage of any UTF-8 compatible language and EMOJI graphics, mentioning other users.

The present invention teaches a "Watch Together" chat room which is a temporary chat channel that is generated when at least one user clicks a "Watch Together" button while watching some video. A new temporary chat channel is generated for each video source (combination of video site domain and video title) and can be used to communicate with users who watch the same video.

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the present invention.

The present invention teaches a web browser extension enabling internet ("over the top") worldwide public chat capabilities matched to specified ("URL") streaming content and non specified ("prenamed & hardcoded") streaming content rooms. The present invention specifically enables people/online users to join chats while watching the same video on different video streaming platforms.

With respect to the hardware components of the platform of the present invention, the present invention requires a Server platform, a Browser extension, and a Chat Visual interface to, in combination, run and execute the method/process written into the software code.

Figure 1:
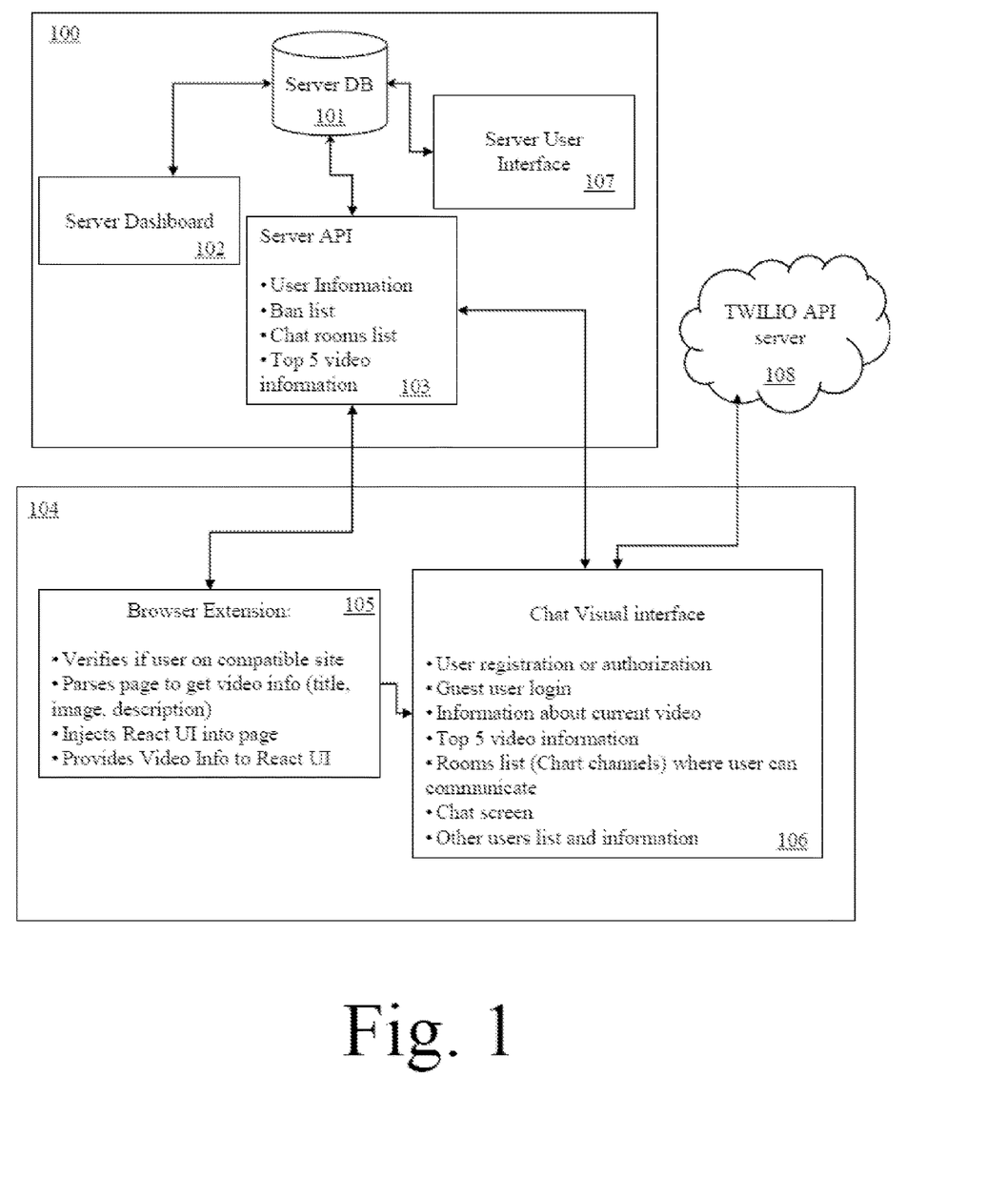
FIG. 1 is a diagram illustrating a platform architecture of the present invention according to some embodiments.

The server platform 100 includes a database server 101 for storing information, and administration dashboard for statistical information, user management (ability to add, remove or ban user by username and IP), chat list management (ability to add, edit or remove chat rooms available for users), advertisement management (ability to add, edit or remove advertisements. Advertisement is a combination of image or video graphics, url of advertised product).

A user interface 106 for the platform provides promotion, user registration/authentication, user profile management. It's a combination of server software applications built using ReactJS framework. It allows users to get information about the platform taught by the present invention, how to install the browser extension taught by the present invention, ability to register as new user, login as existing user, and view and edit profile of currently logged user.

API services 103 that can be accessed by Browser extension 105 and Chat Visual Interface 106 parts of the platform. API services 103 is a server software application built using ReactJS and nodeJS frameworks. The API services 103 server software application provides different information in a predefined format depending on request from client software (Browser extension 104 and Chat Visual interface 106). Information includes data for user registration and authentication, "Top 5 Carousel" feature, and advertisements data.

A 3rd party Chat API provides full management of user communications. The platform taught by the present invention uses a TWILIO chat SDK now 107, and this can be changed in feature without affecting any other parts of platform or any user experience Browser Extension 105 is a software application that is executed in a Web Browser virtual environment 104 and can communicate with browsers and web pages via public web browser APIs. The platform of the present invention currently uses Google Chrome Extensions SDK which allows the browser extension 105 taught by the present invention to be installed in all compatible web browsers like GOOGLE CHROME, MOZILLA FIREFOX, MICROSOFT EDGE and others.

The browser extension 105 part taught by the present invention includes: a background and content script. The background communicates with a Server API 103 and provides service functions for a content script part of the browser extension 105. The content script is embedded into each page context by the Web Browser. This part validates web page url, parses page content for video information (title, description, preview image), embeds Chat Visual interface 106 part into web page and provides video information to a Chat Visual interface 106 part. A Visual interface is embedded into web page content using iframe HTML tag as a web page and visual interface does not have any method to communicate (send or receive data, change content) between each other.

The Chat Visual interface 106 part of the present invention is a visual interface (UI, User interface) is a software application built using ReactJS framework. The Chat Visual 106 interface provides visual interface for: user authentication with login and password, registration of new user, temporary login as guest user, view information about videos in "Top 5 Carousel", shows advertisements from Server part, view list of available chat rooms and provides Visual interface where users can read and send messages being in same chat room(chat channel).

The present invention teaches a "Watch Together" chat room which is a temporary chat channel that is generated when at least one user clicks a "Watch Together" button while watching some video. A new temporary chat channel is generated for each video source (combination of video site domain and video title) and can be used to communicate with users who watch or watched the same video.

The present invention enabled any user to join any available chat room and communicate with other users in the same chat room (chat channel). A list of available rooms is stored on the server and requested using server API. Software implementation of chats is done using a 3rd party API. Communication includes the ability to read public and private messages from other users, write a message to all users in a chat room or direct message personally to a single user. Messaging allows usage of any UTF-8 compatible language and EMOJI graphics, mentioning other users. TWILIO Chat API is currently used by the present invention, it can be changed to any other provider without affecting user experience or any other parts of the platform taught by the present invention.

Additionally, the platform of the present invention enables a view list of users in current chat room. View information is available in a user profile.

FIG. 1 describes the main components of the platform of the present invention comprising a server part 100 including a Server database 101, a Server Admin Dashboard 102, a Server API 103, and a Server User Interface 107, client part 104 including Browser Extension 105 and Chat Visual interface 106. And Twillio Chat API 108 as current 3rd party chat API provider.

User's information and product configuration data is stored in the server database 101 and the Browser Extension 105 and Chat Visual Interface 106 can read/write to it with the Server API 103 using predefined JSON format in HTTPS requests. Server User Interface 107 and Server Dashboard 102 communicate with the Server database 101 directly. A MySQL server and its API is used as the current Server database 101 in one embodiment of the present invention, this can be changed in the future without affecting other parts of the platform taught by the present or any user experience. A 3rd party Chat API 108 is called directly by a Chat Visual Interface 106 part using official REACT JAVASCRIPT objects as provided by a Chat Visual interface 106. A TWILLIO Chat API 108 is currently used in the platform taught by the present invention, and this can also be changed at any time without affecting other parts or any user experience.

Figure 2:
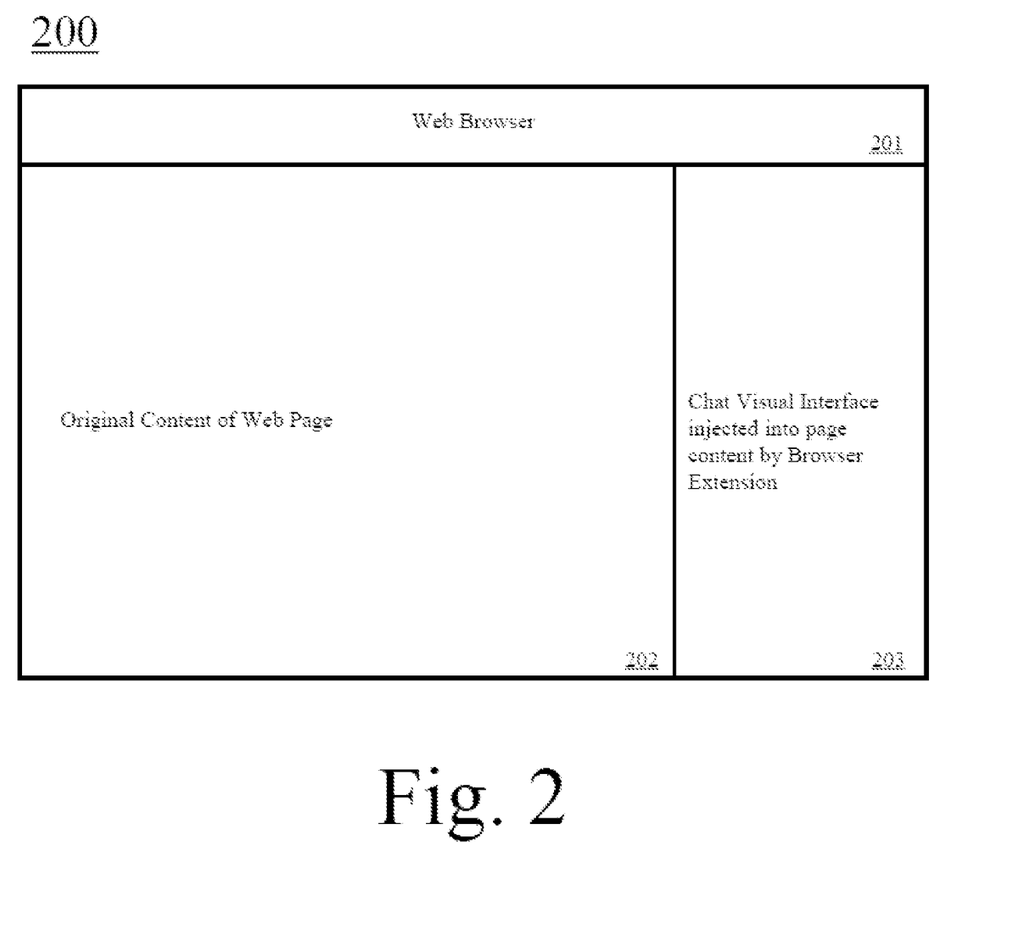
FIG. 2 is a diagram illustrating a Web Browser with the installed platform Browser Extension according to some embodiments of the present invention.

FIG. 2 illustrates a Web Browser User Interface 200 on a supported website with enabled the Browser extension taught by the present invention. The Web Browser User Interface 200 consist of three display sections, a Web Browser 201 displaying Original page Content 202 in one display panel or pane and a Chat Visual Interface injected by Browser Extension into the page content 203 and displayed adjacent to the panel of pane of the Original page Content 202.

Figure 3:
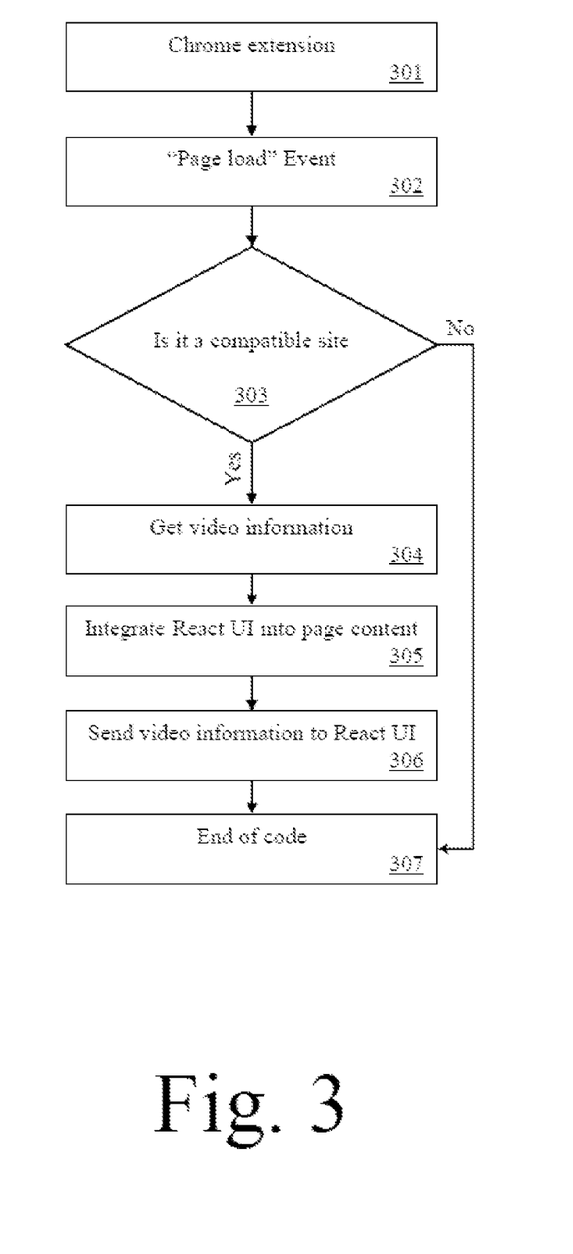
FIG. 3 is a diagram illustrating a Browser Extension Interface part of the platform of the present invention that integrates communications User Interface ("Chat Visual interface") into various video streaming sites according to some embodiments.

FIG. 3 describes the basic code flow in a Browser extension part of the platform taught by the present invention. In a first step, a Content Script part of Browser Extension 301 is injected into each web page by a Browser. After the page loading event 302, a loaded Content Script starts monitoring page DOM structure changes using Mutation Observer Browser API. When specific conditions are met (HTML tags with some ID and CLASS attributes) and site compatibility is confirmed 303, the Content Script scans for other specific HTML tags to find video information (Video title, Video Description, Video Preview Image) 304. This data is temporarily stored in the Content Script 305. Next the Content Script creates a new IFRAME tag with the url of the Chat Visual interface 306. The Content script updates the DOM structure of the current page so there is no interference between page interface and Chat Visual Interface and the process ends 307.

Figure 4:
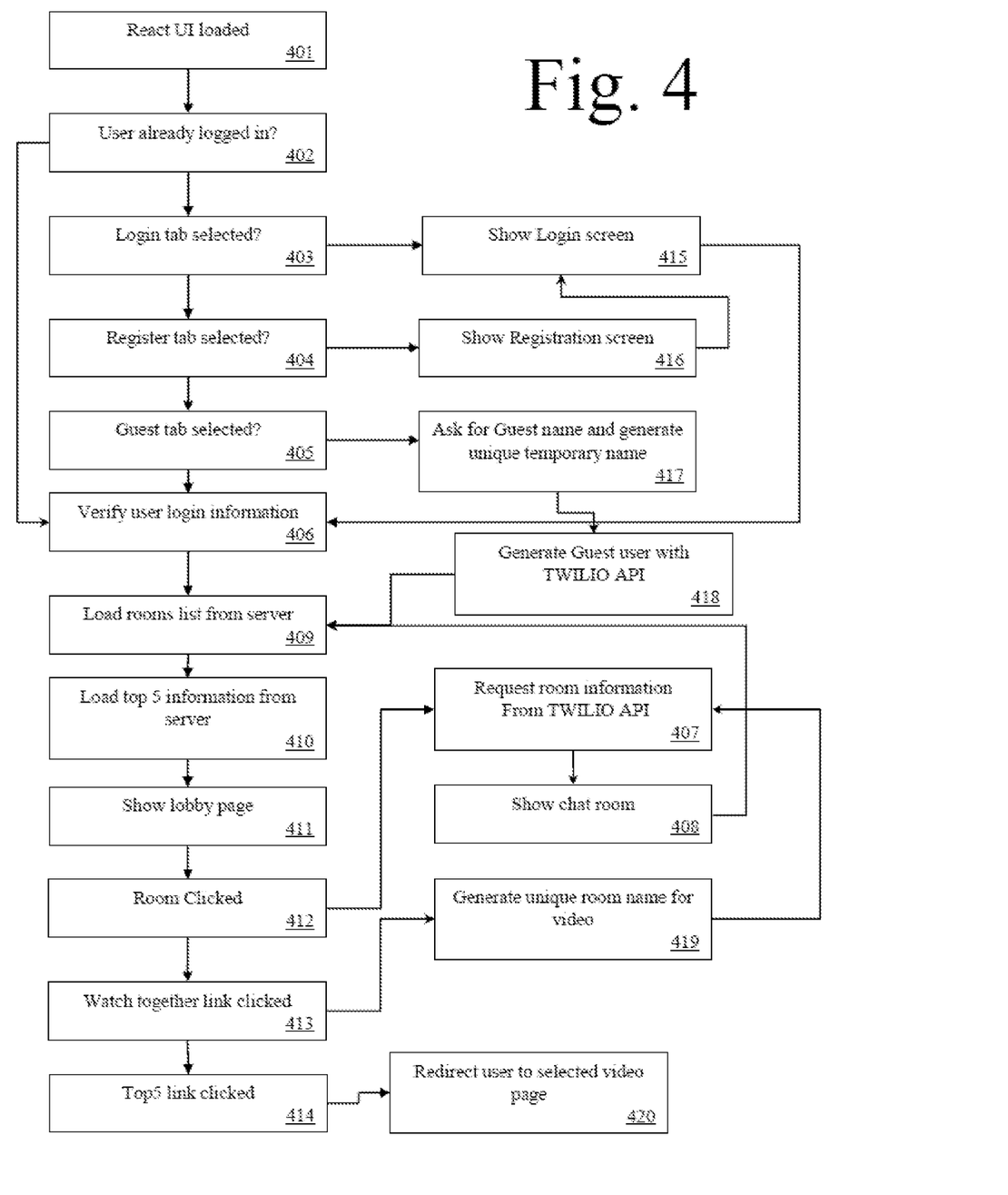
FIG. 4 illustrates a main part of User Interface ("Chat Visual interface") part of the platform of the present invention which provides a visual interface for chats where people can communicate according to some embodiments.

FIG. 4 describes a basic code flow in a Chat Visual Interface. At the start Chat Visual interface sends a call to Content Script part using Messaging API of Web browser and receives Video Information in return 401. After this Chat Video interface checks if there is a saved user credentials (login, password, authenticate token) using Local Storage API of the Web Browser 402.

If found, the Chat Visual interface goes to the User Validation step 406.

If not found, HTML content with options to login as existing user 403, register a new user 404, or login as guest user 405 is displayed to the user.

If a user uses the "login as existing user" 403 option, after displaying the login screen 415, the Chat Visual Interface goes to the User Validation step 406.

If the "register a new user" 404 option is used by the user—HTML content with registration form is displayed to the user 416. After completion, the Visual interface returns to "display login screen" step 415.

If "login as guest user" 405 option is selected—HTML content with the guest form 417 is shown. Once complete, the Visual interface calls a 3rd party Chat API to generate a new user based on guest user name and time based random charters 418 and proceeds to step 409.

Once complete login is completed, the Visual interface steps into a "Load rooms list from server" step 409.

At step 406 User validation sends a HTTPS request to a Server API with login, password and authentication token (if exists), Server API parts calls a Server database to validate if such authentication token or user with such login and password exists and returns a new authentication token or error message to Chat Visual Interface.

Chat visual interface checks if there is an error message. If error message exists—the error is shown to user and it returns first step 401.

If no error message is found and authentication token contained in response—Chat Visual Interface proceeds to "Load rooms list from servers" step 409.

Step 409 sends a HTTPs request in a predefined format to a Server API part to receive a list of available chat rooms. Once received it proceeds to Step 410.

Step 410 "Load top 5 information from server" sends a HTTPS request in a predefined format to a Server API to receive a list of records for "Top5 Carousel" feature. Once received it proceeds to step 411.

"Show lobby pages" 411 Chat Visual interface parses data received in Steps 409 and 411 and generates HTML content to display this data including, but not limited to current user information, "Top 5 Carousel" data 414, available chat rooms, "Watch Together" 413 feature.

"Top 5 Carousel" 414 is an animated HTML content displaying video information (preview image, title, description) about 5 top popular movies viewed by the platform taught by the present invention. Users can click on this information and the current browser page will be redirected to the Video site with this Video content 420.

A "Watch together" feature 413 is a temporary chat channel, which is generated when at least one user clicks a "Watch together" button in Chat Visual interface while being on some video site.

A unique name based on video site domain and video title is generated 419 and a new chat room created with 3rd party Chat API 407.

The User next redirects to the "Show chat room" step 408.

Also when a user clicks on any of the listed in Chat Visual Interface rooms—he is redirected to the "Show Chat Room" step 408.

"Show Chat Room" step 408 generates a HTML interface where users can read messages sent by other users and write and send their own messages. At the start of step Chat Visual Interface calls a 3rd party Chat API with a request to join the chat channel associated with this chat room.

Figure 5A:
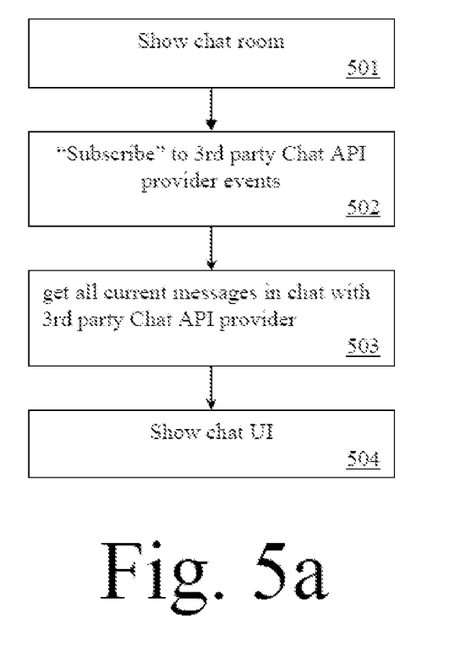
FIGS. 5a, 5b, 5c, and 5d illustrate a User Interface ("Chat Visual interface") part of the Chat Part of the platform of the present invention which provides a visual interface for chats where people can communicate according to some embodiments.

FIGS. 5*a* describe as code flow of the messaging UI that generated at step 408 of FIG. 4.

At step 501 "Show chat room" the 3rd party Chat API returns a JAVASCRIPT API object associated with this chat channel. The visual interface can get information about current messages in a chat channel, users in a chat channel, subscribe to events when a new message is available, send a message to a chat channel or direct message to users in this channel using this JAVASCRIPT Object.

As second step 502 code "subscribes" to events(new message, new user) available in the 3rd Party chat API and at step 503 it generates HTML content with information about messages and users in chat channel and interface to write and send new message.

Figure 5B:
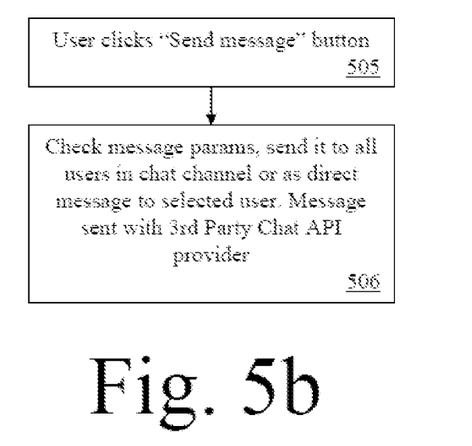

In FIG. 5b, if a user types new message and clicks Send button 505—code checks message code, replaces special codes to EMOJIS, checks if there are predefined words to send message only to specified user(direct messages) and calls 3rd party API provider to send new message.

Figure 5C:
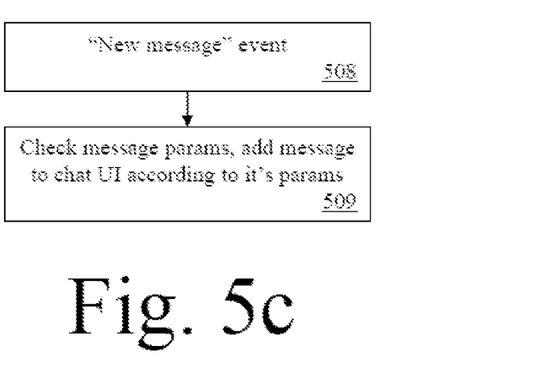

In FIG. 5c, if a new message 508 event received, code checks message params 509 and generates HTML content to display this message according to params.

Figure 5D:
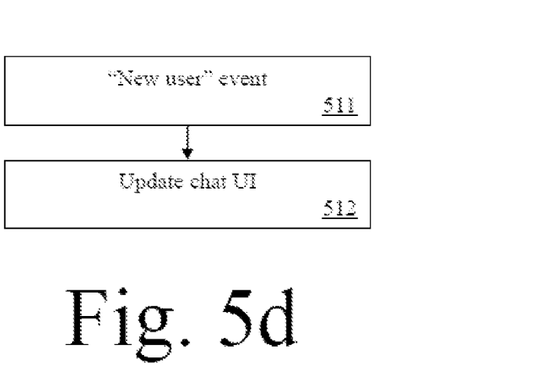

In FIG. 5d, if a new user 511 event received, code generates HTML content to display information that new user joined chat room.

The system is set to run on a computing device or mobile electronic device. A computing device or mobile electronic device on which the present invention can run would be comprised of a CPU, Hard Disk Drive, Keyboard, Monitor, CPU Main Memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for providing a web browser extension enabling internet ("over the top") worldwide public chat capabilities matched to specified ("URL") streaming content and non-specified ("prenamed & hardcoded") streaming content rooms, recorded on computer-readable medium and capable of execution by a computer, the method comprising the steps of:
   providing a Server platform,
   providing a Browser extension,
   providing a Chat Visual interface; and
   accessing application programming interface (API) services by the Browser extension and the Chat Visual interface parts of platform, wherein the API services are a server software application that provides information in a predefined format depending on a request from the Browser extension and the Chat Visual interface, wherein the information includes data for user registration, user authentication, a "Top 5 Carousel" feature, and one or more advertisements.

2. The method of claim 1, wherein the server platform includes
   a database server for storing information,
   an administration dashboard for statistical information and user management;
   a chat list management; and
   an advertisement management.

3. The method of claim 1, wherein
a user interface for the platform provides promotion, user registration, user authentication, and user profile management.

4. The method of claim 1, wherein
the server software application is built by using a ReactJS framework and a nodeJS framework.

5. The method of claim 1, wherein
a 3rd party Chat API provides full management of user communications.

6. The method of claim 1, wherein
the Browser Extension is a software application that is executed in a Web Browser virtual environment and can communicate with browsers and web pages via public web browser APIs.

7. The method of claim 6, wherein
the browser extension includes:
   a background, and
   a content script;
      the background communicates with a Server API and provides service functions for a content script part of the browser extension; and
      the content script is embedded into each page context by the Web Browser.

8. The method of claim 6, wherein
the chat visual interface is embedded into web page content using iframe HTML tag as a web page, wherein the web page content and the chat visual interface does not have any method to communicate between each other.

9. The method of claim 8, wherein the Chat Visual interface provides visual interface for:
   user authentication with login and password,
   registration of new user,
   temporary login as guest user,
   view information about videos in "Top 5 Carousel",
   shows advertisements from Server part, and
   provides a view list of available chat rooms.

10. The method of claim 9, further comprising
a "Watch Together" chat room which is a temporary chat channel that is generated when at least one user clicks a "Watch Together" button while watching some video; and
a new temporary chat channel is generated for each video source (combination of video site domain and video title) and can be used to communicate with users who watch the same video.

11. The method of claim 1, further comprising the steps of
enabling any user to join any available chat room and communicate with other users in the same chat room or chat channel;
providing a list of available rooms is stored on the server and requested using server API; and
communication includes the ability to read public and private messages from other users, write a message to all users in a chat room or direct message personally to a single user.

12. The method of claim 11, wherein
messaging allows usage of any UTF-8 compatible language and EMOJI graphics, mentioning other users.

13. The method of claim 11, wherein
the platform of the present invention enables a view list of users in current chat room; and
view information is available in a user profile.

\* \* \* \* \*